United States Patent [19]
McDonald

[11] 4,334,280
[45] Jun. 8, 1982

[54] SYSTEM AND METHOD FOR PROVIDING AN AUDIBLE SOUND AND A TACTILE FEEDBACK IN AN ELECTRONIC DATA PROCESSING SYSTEM

[75] Inventor: Wylie W. McDonald, Lubbock, Tex.

[73] Assignee: Texas Instruments Incorporated, Dallas, Tex.

[21] Appl. No.: 161,297

[22] Filed: Jun. 9, 1980

[51] Int. Cl.³ .................. G06F 3/16; G04C 21/12
[52] U.S. Cl. ..................... 364/710; 340/384 E; 340/407; 364/705; 368/248; 368/255
[58] Field of Search ............ 364/200, 569, 705, 710, 364/900; 340/384 E, 407; 368/63, 75, 248, 255

[56] References Cited

U.S. PATENT DOCUMENTS

| | | | |
|---|---|---|---|
| 4,149,257 | 4/1979 | Nakagiri et al. | 368/255 X |
| 4,172,359 | 10/1979 | Gorsky et al. | 340/384 E X |
| 4,185,169 | 1/1980 | Tanimoto et al. | 364/710 X |
| 4,185,283 | 1/1980 | Clark | 340/407 X |
| 4,192,133 | 3/1980 | Komaki | 368/248 X |
| 4,249,245 | 2/1981 | Nakanishi et al. | 364/710 |

*Primary Examiner*—Jerry Smith
*Attorney, Agent, or Firm*—Robert D. Marshall, Jr.; Leo N. Heiting; Melvin Sharp

[57] ABSTRACT

In an electronic data processing system a system and method for providing an audible sound and a tactile feedback for a user. In one embodiment the data processing system includes a manually operable input device, a control circuit responsive to a first electrical signal indicative of the operation of the input device for generating a control signal and a sound generating device responsive to the control signal for being excited into mechanical motion to generate an audible sound and provide a tactile feedback for the user. In another embodiment, the data processing system includes a timekeeping circuit for providing a plurality of time-related functions and a control circuit which is responsive to a second electrical signal generated periodically at selected time intervals by the timekeeping circuit for activating the sound generating device to provide an audible sound periodically at the selected time intervals, such as, for example, at one second intervals, during the operation of the system.

35 Claims, 3 Drawing Figures

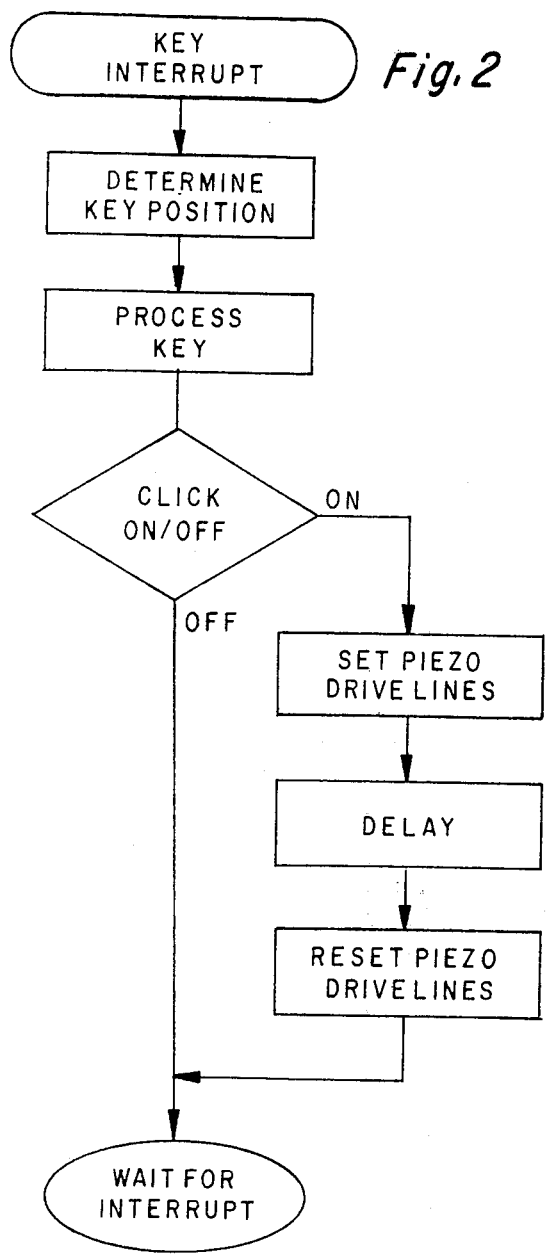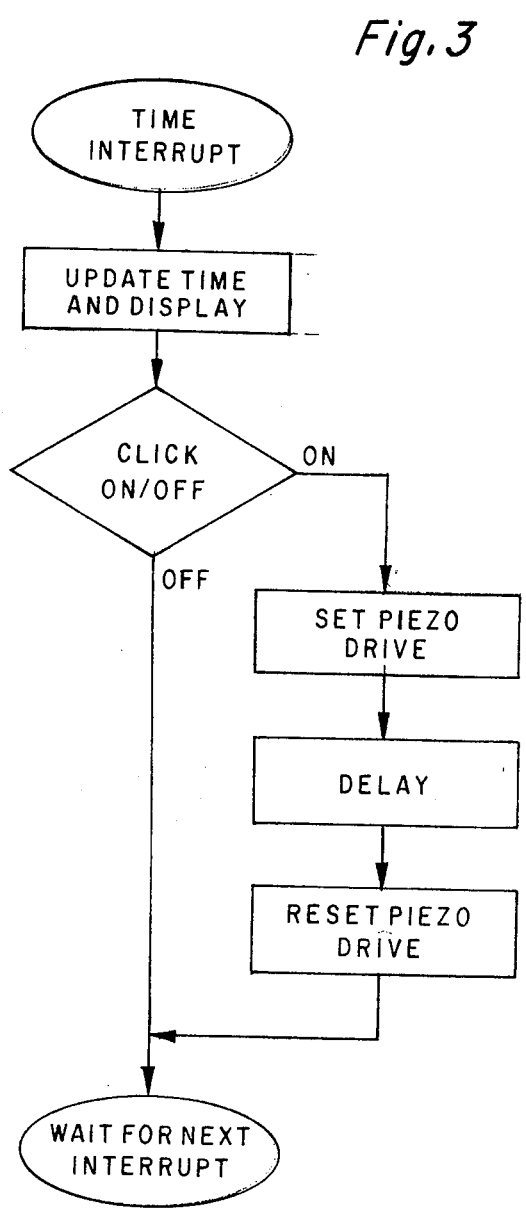

SYSTEM AND METHOD FOR PROVIDING AN AUDIBLE SOUND AND A TACTILE FEEDBACK IN AN ELECTRONIC DATA PROCESSING SYSTEM

BACKGROUND OF THE INVENTION

This invention relates to electronic data processing systems and in particular to a data processing system having means for selectively providing an audible sound.

Electronic systems for producing audible sounds in response to the operation of an input device such as a keyboard or the like are well known in the art. Such systems typically include a solenoid or other transducer device which produces a "clicking" or "beeping" sound in response to an electrical signal indicative of the operation of a keyboard or other input device. Some electronic calculators include sound generating devices for producing an audible sound each time an input key is pushed. Other types of calculators have keyboards with snap-action key switches which give the user a tactile sensation each time a key is pushed. None of these systems, however, provides both an audible and a tactile feedback to the user each time the input device is operated.

Data processing systems such as electronic timepieces and timekeeping calculators having time and alarm functions are also known in the art. Many electronic timepieces and timekeeping calculators have an audible alarm function which is settable to go off at a particular time. In such devices, the alarm must be preset by the user and no audible sound is generated during the interim, such as in a mechanical or electromechanical timepiece from which a ticking sound emanates every second during operation.

SUMMARY OF THE INVENTION

It is therefore one object of the invention to provide an electronic data processing system having manually operable input means for providing audible and tactile feedback to a user each time the input means is operated.

It is another object of the invention to provide an electronic data processing system having timekeeping circuitry for providing a plurality of time-related functions in which an audible sound is generated periodically at selected time intervals during the operation of the system.

It is yet another object of the invention to provide an electronic calculator having keyboard input means in which audible and tactile feedback are provided for a user each time the user activates a key switch on the keyboard.

It is a further object of the invention to provide an electronic timekeeping device in which an audible sound is generated every second during the operation of the device.

These and other objects are accomplished in accordance with the present invention. An electronic data processing system selectively provides an audible sound and a tactile feedback to a user. In one embodiment the system includes control means responsive to the operation of an input device for generating a control signal and sound generating means responsive to the control signal for being excited into mechanical motion to generate an audible sound and provide a tactile feedback to the user. In another embodiment, the data processing system includes timekeeping means for providing a plurality of time-related functions. An audible sound is generated periodically at selected time intervals during the operation of the timekeeping means. In another embodiment, the system includes means for selectively disabling the sound generating means so that no audible sound is produced if the user so desires.

In a preferred embodiment the input device is a keyboard having a plurality of activatable key switches and the sound generating means is comprised of a piezoelectric transducer. The control means is comprised of digital processor means having a plurality of input terminals for receiving first electrical signals indicative of the operation of the keyboard and second electrical signals generated periodically at selected time intervals by the timekeeping means and a plurality of output terminals, selected ones of which are used to generate the control signal to activate the piezoelectric transducer. The system further includes drive means coupled between the selected output terminals of the digital processor means and the piezoelectric transducer for applying electrical energy to the transducer to excite the transducer into mechanical motion in response to the control signal. The transducer is preferably of sufficient size with respect to the mass and inertia of the data processing system such that the mechanical motion of the transducer is felt by the user at the keyboard to provide a tactile feedback as well as an audible sound each time a key is pushed. The timekeeping means preferably generates a second electrical signal at one second intervals so that the digital processor means activates the transducer to produce an audible sound every second, thereby simulating the ticking sound of a mechanical watch.

BRIEF DESCRIPTION OF THE FIGURES

Still further objects and advantages of the invention will be apparent from the detailed description and claims when read in conjunction with the accompanying drawings wherein:

FIG. 2 is a flow diagram showing the activation of a piezoelectric transducer to provide an audible sound in response to the operation of a keyboard input device; and FIG. 3 is a flow diagram showing the activation of the piezoelectric transducer to provide an audible sound in response to timekeeping signals generated periodically.

DETAILED DESCRIPTION OF THE INVENTION

Figure 1:
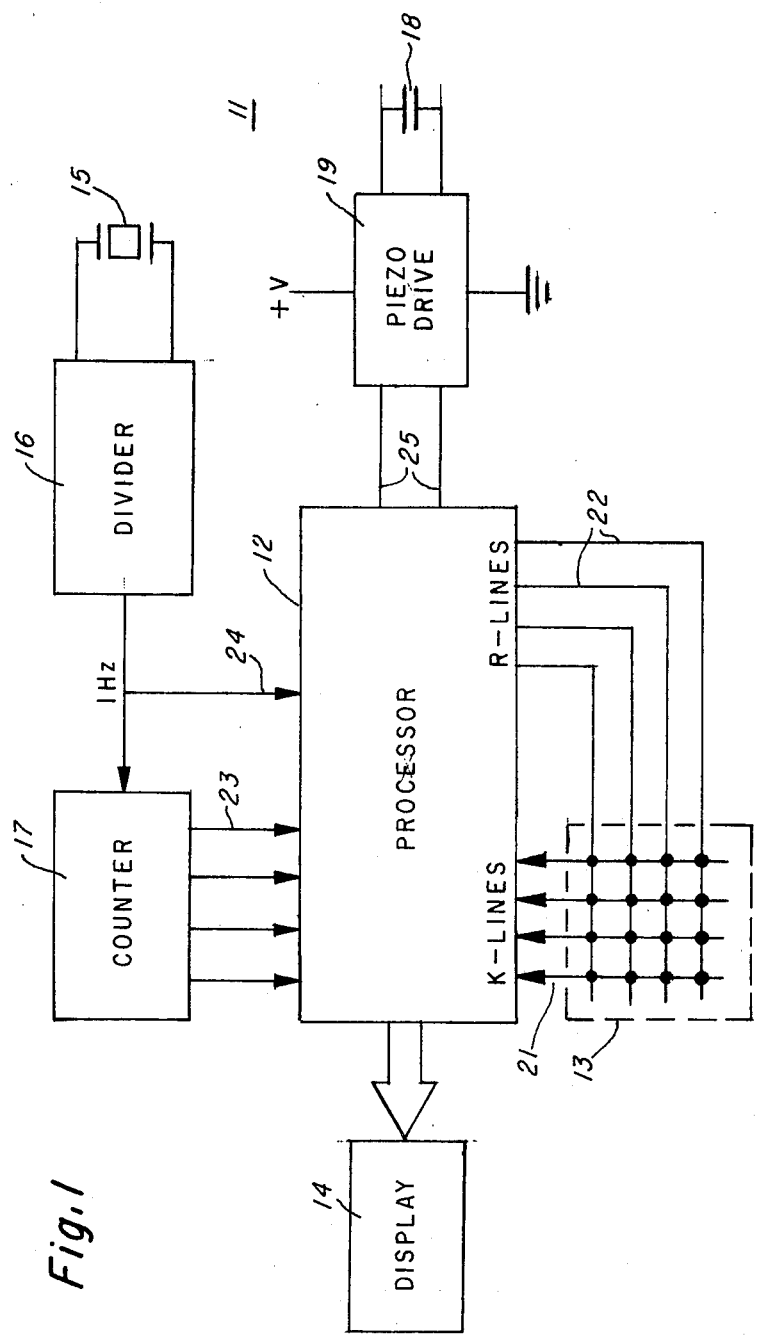
FIG. 1 is a block diagram of the present invention.

Referring to FIG. 1, a preferred embodiment of the present invention in an electronic calculator system 11 is shown. System 11 includes a digital processor 12; a keyboard 13 for selectively entering data and information into digital processor 12; a visual display 14, such as a liquid crystal display, for displaying the results of selected operations performed by digital processor 12; and timekeeping circuitry comprised of oscillator 15, frequency divider 16, and counter 17. The system further includes a piezoelectric transducer 18 and drive means 19 for selectively activating transducer 18 to provide an audible sound. All of the components shown in FIG. 1, except keyboard 13, display 14 and transducer 18 are preferably implemented on a single semiconductor chip.

Keyboard 13, which is preferably an elastomer type keyboard, includes a plurality of activatable keyswitches, preferably arranged in matrix fashion and coupled between selected input terminals 21 (K-lines) and selected output terminals 22 (R-lines) of processor 12. Digital processor 12, which is preferably of the TMS 1000 family of digital processors, manufactured and sold as standard products by Texas Instruments Incorporated, assignee of the present invention, scans keyboard 13 by selectively transmitting electrical signals on output terminals 22 and receiving input signals indicative of the states of the respective key switches on input terminals 21. Timekeeping information is transmitted to processor 12 from counter 17 via lines 23 and a 1 HZ clocking signal from frequency divider 16 is entered into digital processor 12 on line 24.

The sequence of operation of system 11 to provide an audible sound is best seen with reference to FIGS. 2 and 3 along with FIG. 1. Referring to FIG. 2, when a user pushes a particular key of keyboard 13, a first INTERRUPT signal indicative of the operation of keyboard 13 is transmitted on an input terminal 21 to digital processor 12. Digital processor 12 determines the key position and processes the information entered therein.

Keyboard 13 preferably includes manually settable switch means (not shown) whereby the user selectively enables and disables transducer 18 from producing an audible sound. If transducer 18 is disabled (CLICK OFF), digital processor 13 awaits the next INTERRUPT signal, but if transducer 18 is enabled (CLICK ON), processor 12 generates a SET control signal on drive lines 25, to which drive means 19 is responsive for exciting transducer 18 into mechanical motion to produce an audible sound.

Drive means 19, in response to the SET control signal, alternately applies a predetermined voltage V, such as, for example, 3 volts, to opposite sides of transducer 18, thereby causing transducer 18 to flex rapidly in one direction and then the other to generate sound energy. By rapidly switching the polarity of the applied voltage, transducer 18 experiences an excitation force which is equivalent to twice the voltage applied at any given time, thereby achieving a higher effective voltage with a given applied voltage.

After an appropriate delay period to compensate for the inherent delay in activating transducer 18, digital processor 12 generates a RESET control signal to reset drive lines 25 and deactivate transducer 18.

The rapid switching on and off of transducer 18 produces a "clicking" type sound of approximately 100 micro-second duration each time the user pushes a key switch on keyboard 13, thereby providing an audible feedback to the user. Transducer 18 is preferably of sufficient size with respect to the mass and inertia of calculator system 11 such that the user is able to feel the mechanical motion of transducer 18 at keyboard 13 when a key is pushed, thereby providing tactile feedback.

Referring to FIG. 3, a second INTERRUPT signal having a frequency of 1 HZ is transmitted to processor 12 on line 24. Processor 12 is responsive to the second INTERRUPT signal for updating time information stored therein and displayed on display 14. If the user has disabled transducer 18 (CLICK OFF), processor 12 awaits the next INTERRUPT signal. If transducer 18 is enabled (CLICK ON), processor 12 then generates the SET control signal, followed by the RESET control signal after the appropriate delay period to activate transducer 18 for a predetermined period of time, as described above, at one second intervals.

Thus, transducer 18 is turned on and off each second to provide a "ticking" sound which is similar to the ticking of a mechanical watch or clock. The present invention has been described with reference to a timekeeping calculator system. It will be obvious however, to those skilled in the art that the present invention can be implemented in electronic data processing systems, such as electronic calculators, without timekeeping capability to provide audible and tactile feedback to the user each time an input device, such as a keyboard, is operated or in an electronic timepiece, such as a digital wrist watch or the like, to provide an audible sound every second which is similar to the ticking sound of a mechanical timepiece.

Various embodiments of the present invention have been described in detail. Since it is obvious that many additional changes and modifications can be made in the above-described details without departing from the nature and spirit of the invention, the invention is not to be limited to those details except as set forth in the appended claims.

What is claimed is:

1. In an electronic data processing system having manually operable input means, means for providing an audible sound and a tactile feedback to a user when said input means is operated, comprising:
    (a) control means responsive to a first electrical signal indicative of the operation of said input means for generating a control signal; and
    (b) transducer means responsive to said control signal for being excited into mechanical motion to generate an audible sound and provide tactile feedback for the user.

2. The system according to claim 1 further including timekeeping means for providing a plurality of time-related functions, said control means being responsive to a second electrical signal generated repetitively at a selected time interval by said timekeeping means for generating said control signal, said selected time interval corresponding to an interval of mechanical clock operation, said transducer means being responsive to said control signal for generating said audible sound at said selected time interval in synchronism with said second electrical signal, thereby simulating the sound of mechanical clock operation.

3. The system according to claim 2 wherein said timekeeping means includes oscillator means and frequency divider means for providing timekeeping signals and counter means for keeping track of said timekeeping signals.

4. The system according to claim 2 wherein said input means is comprised of a keyboard having a plurality of activatable key switches.

5. The system according to claim 2 wherein said transducer means includes a piezoelectric transducer.

6. The system according to claim 5 wherein said control means is comprised of a digital processor means having a plurality of input and output terminals, said sound generating means being coupled to selected ones of said output terminals of said digital processor means.

7. The system according to claim 6 further including drive means coupled between said selected output terminals of said digital processor means and said piezoelectric transducer for exciting said piezoelectric transducer into mechanical motion in response to said control signal being generated by said digital processor means.

8. The system according to claim 7 wherein said drive means excites said piezoelectric transducer into mechanical motion by alternately applying selected voltages of opposite polarity to said transducer in a predetermined sequence.

9. The system according to claim 2 further including means for selectively disabling said control means from generating said control signal so that no audible sound is generated in response to said first and second electrical signals.

10. In an electronic data processing system having timekeeping circuitry for providing a plurality of time-related functions, means for providing an audible sound repetitively at a selected time interval, comprising:
   (a) control means responsive to a first electrical signal generated repetitively at a selected time interval by said timekeeping circuitry for generating a control signal, said selected time interval corresponding to an interval of mechanical clock operations; and
   (b) sound generating means responsive to said control signal for generating an audible sound at said selected time intervals during the operation of the system, thereby simulating the sound of mechanical clock operation.

11. The system according to claim 10 wherein said first electrical signal is generated once each second and said audible sound is generated at one second intervals.

12. The system according to claim 10 wherein said data processing system includes manually operable input means for selectively entering data into said system, said control means being further responsive to a second electrical signal indicative of the operation of said input means for generating said control signal, said sound generating means being responsive to said control signal for providing said audible sound when said input means is operated.

13. The system according to claim 12 wherein said input means is comprised of a keyboard having a plurality of activatable key switches.

14. The system according to claim 10 wherein said timekeeping circuitry includes oscillator means and frequency divider means for providing timekeeping signals and counter means for keeping track of said timekeeping signals.

15. The system according to claim 10 wherein said sound generating means is comprised of a piezoelectric transducer.

16. The system according to claim 15 wherein said control means is comprised of digital processor means having a plurality of input and output terminals, said piezoelectric transducer being coupled to selected ones of said output terminals of said digital processor means.

17. The system according to claim 16 further including drive means coupled between said selected output terminals of said digital processor means and said piezoelectric transducer for exciting said piezoelectric transducer into mechanical motion in response to said control signal being generated by said digital processor means.

18. The system according to claim 10 further including output means for indicating the results of selected operations performed by said data processing system.

19. In an electronic data processing system having manually operable input means, a method for providing audible and tactile feedback to a user when said input means is operated, said method comprising the steps of:
   (a) providing control means responsive to the operation of said input means for generating a control signal;
   (b) coupling transducer means to said control means so that said transducer means is responsive to said control signal; and
   (c) generating said control signal in response to the operation of said input means so that said transducer means is excited into mechanical motion to generate an audible sound and provide a tactile feedback for the user.

20. The method according to claim 19 wherein said data processing system further includes timekeeping means for providing a plurality of time-related functions, said control means being further responsive to an electrical signal generated repetitively at a selected time interval by said timekeeping means for generating said control signal, said selected time interval corresponding to an inverval of mechanical clock operation, said method further including the step of generating said control signal in response to said electrical signal so that said audible sound is generated at said selected time interval during the operation of the system, thereby simulating the sound of mechanical clock operation.

21. In an electronic data processing system having timekeeping circuitry for providing a plurality of time-related functions, a method for providing an audible sound repetitively at a selected time interval, said method comprising the steps of:
   (a) providing control means responsive to an electrical signal generated repetitively at a selected time interval by said timekeeping circuitry for generating a control signal, said selected time interval corresponding to an interval of mechanical clock operation;
   (b) providing sound generating means and coupling said sound generating means to said control means so that said sound generating means is responsive to said control signal; and
   (c) generating said control signal in response to said electrical signal so that said sound generating means generates an audible sound at said selected time interval during the operation of the system, thereby simulating the sound of mechanical clock operation.

22. The method according to claim 21 wherein said data processing system further includes manually operable input means for selectively entering data into said system, said control means being further responsive to the operation of said input means for generating said control signal, said method further including the step of generating said control signal in response to the operation of said input means so that said sound generating means provides said audible sound when said input means is operated.

23. An electronic data processing system comprising:
   (a) input means for selectively entering data into said system;
   (b) timekeeping circuit means for providing a plurality of time-related functions;
   (c) digital processor means for generating a control signal in response to a first electrical signal indicative of the operation of said input means and in response to a second electrical signal generated repetitively at a selected time interval by said timekeeping circuit means, said selected time interval corresponding to an interval of mechanical clock operation; and (d) transducer means responsive to said control signal for generating an audible sound when said input means is operated and repetitively at said selected time intervals during the operation of said system, thereby simulating the sound of mechanical clock operation.

24. The system according to claim 23 wherein said transducer means is excited into mechanical motion in response to said control signal to provide tactile feedback to a user when the input means is manually operated.

25. The system according to claim 24 wherein said transducer means is of sufficient size with respect to said data processing system such that the user is able to feel the motion of said transducer means at the input means so that tactile feedback is provided.

26. The system according to claim 23 wherein said input means is comprised of a keyboard having a plurality of activatable key switches and said digital processor means has a plurality of input and output terminals, said keyboard being coupled between selected one of said input and output terminals for allowing information to be entered into said digital processor means.

27. The system according to claim 26 wherein said transducer means is a piezoelectric transducer coupled to selected ones of said output terminals of said digital processor means.

28. The system according to claim 27 further including driver means coupled between said selected output terminals of said digital processor means and said piezoelectric transducer for providing electrical energy to activate said transducer.

29. The system according to claim 23 further including output indicating means for indicating the results of selected operations of said data processing system.

30. The system according to claim 29 wherein said output indicator means is a display.

31. The system according to claim 23 wherein said data processing system is an electronic calculator.

32. The system according to claim 23 wherein said data processing system is an electronic timepiece.

33. An electronic data processor having terminals for connection to an input device and a sound generating device comprising:
(a) processing means for processing information entered into said data processor, said processing means being responsive to a first electrical signal indicative of the operation of said input device for activating said sound generating device to provide an audible sound; and
(b) timekeeping means for providing time-related functions, said processing means being responsive to a second electrical signal generated repetitively at a selected time interval by said timekeeping means, said selected time interval corresponding to an interval of mechanical clock operation for activating said sound generating device to provide an audible sound at said selected time intervals, thereby simulating the sound of mechanical clock operation.

34. The processor according to claim 33 wherein said second electrical signal is generated at one second intervals so that an audible sound is provided every second.

35. The processor according to claim 33 wherein said data processor is implemented on a single semiconductor chip.

* * * * *